United States Patent
Neumann et al.

(10) Patent No.: US 6,608,998 B1
(45) Date of Patent: Aug. 19, 2003

(54) METHOD FOR REDUCING INTER-FREQUENCY BIAS EFFECTS IN A RECEIVER

(75) Inventors: Janet Brown Neumann, Calgary (CA); Marcia Bates, Calgary (CA); Robert S. Harvey, Sunnyvale, CA (US)

(73) Assignee: NovAtel, Inc., Calgary (CA)

( * ) Notice: Subject to any disclaimer, the term of this patent is extended or adjusted under 35 U.S.C. 154(b) by 498 days.

(21) Appl. No.: 09/660,104

(22) Filed: Sep. 12, 2000

Related U.S. Application Data

(60) Provisional application No. 60/153,747, filed on Sep. 13, 1999.

(51) Int. Cl.[7] .................................................. H04B 1/10
(52) U.S. Cl. ........................ 455/296; 455/12.1; 455/67.1
(58) Field of Search ............................... 455/296, 427, 455/11.1, 12.1, 67.1, 67.3, 115, 71; 342/357.12, 357.14; 701/213

(56) References Cited

U.S. PATENT DOCUMENTS

| 5,751,244 A | 5/1998 | Huston et al. ............... 342/357 |
| 5,757,677 A | 5/1998 | Lennen .................. 364/571.02 |
| 5,878,330 A | 3/1999 | Naumann ...................... 455/71 |
| 5,914,685 A | 6/1999 | Kozlov et al. ............... 342/357 |
| 5,923,287 A | 7/1999 | Lennen ........................ 342/357 |
| 5,949,372 A | 9/1999 | Lennen .................. 342/357.02 |

FOREIGN PATENT DOCUMENTS

EP            1031845 A2        8/2000

*Primary Examiner*—Thanh Cong Le
*Assistant Examiner*—Thuan T. Nguyen
(74) *Attorney, Agent, or Firm*—Cesari and McKenna, LLP

(57) ABSTRACT

A calibration procedure for reducing frequency-dependent bias effects in a fixed satellite-based ground-positioning receiver is disclosed, the receiver having the capability to receive both GPS and GLONASS satellite signals. The calibration procedure removes satellite dynamics by utilizing the respective satellite ephemeris data, estimates the change in receiver clock offset by means of GPS measurements, and acquires a set of two or more GLONASS pseudorange measurements while cycling a local oscillator in the receiver through a predetermined sequence of different frequencies.

16 Claims, 4 Drawing Sheets

METHOD FOR REDUCING INTER-FREQUENCY BIAS EFFECTS IN A RECEIVER

CROSS REFERENCE TO RELATED APPLICATION

This Application is related to Provisional Application Serial No. 60/153,747 filed on Sep. 13, 1999.

BACKGROUND OF THE INVENTION

1. Field of the Invention

The present invention is related to satellite-based ground-positioning systems and, more particularly, to a method for reducing frequency-related biases in a such a system.

2. Background Information

The Global Navigation Satellite System (GLONASS) is designed to utilize up to twenty four active satellites in earth orbit. Each Global Navigation System (GNS) satellite transmits signals centered on two discrete L-band carrier frequencies, the frequency bands denoted by L1 and L2. The L1 band, for example, includes twenty four transmitting frequencies separated by 0.5625 MHz. A positional system using GLONASS signals employs frequency-division multiplexing to differentiate between the signals of the various satellites. As these signals pass through the RF section of a GLONASS receiver, frequency-related biases are produced, both in the pseudorange and in the carrier phase observations. These biases can arise from, for example, antennas, cables, filters, and various other components in the front end of the receiver.

One method of reducing the effects of the biases is to directly calibrate the receiver RF section. Unfortunately, this method is very labor intensive and requires specialized equipment. A more preferable method is to calibrate the effects of the inter-frequency biases on the measurements and correct the pseudorange or carrier phase measurements accordingly. For example, the calibration procedure may call for calibrating receivers in pairs, or calibrating a single receiver using a multi-channel GLONASS simulator as a reference. However, such calibration procedures do not readily lend themselves to operation in the field. Further, such calibration methods suffer from the shortcoming that the accuracy of the derived frequency biases are based on the functional attributes of the reference receiver or the simulator. Moreover, the multi-channel GLONASS simulator is an expensive device, and may have uncorrectable biases of its own.

While the relevant art describes methods for calibrating global positioning devices, there remains a need for a calibration method that offer advantages and capabilities not presently found, and it is a primary object of this invention to provide such a method.

It is also an object of the present invention to provide a method of calibration which does not require use of supplemental, specialized equipment.

It is another object of the invention to provide such a method which can be performed in the field.

Other objects of the invention will be obvious, in part, and, in part, will become apparent when reading the detailed description to follow.

SUMMARY OF THE INVENTION

The invention results from the realization that a significant source of the inter-frequency pseudorange bias in a GPS/GLONASS receiver results from signal group delay in the IF filter. The disclosed calibration procedure includes the steps of i) removing the dynamics of the GPS and the GLONASS satellites by using the ephemeris data for the satellites; ii) estimating the change in receiver clock offset by means of GPS satellite measurements, and iii) acquiring a set of two or more measurements for each satellite frequency of interest to estimate the corresponding inter-frequency bias. The disclosed method utilizes a receiver microprocessor to obtain pseudorange measurements while the GLONASS local oscillator in the receiver is placed at different frequencies. The disclosed method thus allows individual calibration of receivers and advance calibration of frequencies, where the calibration is valid for single point positioning as well as for differential positioning.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
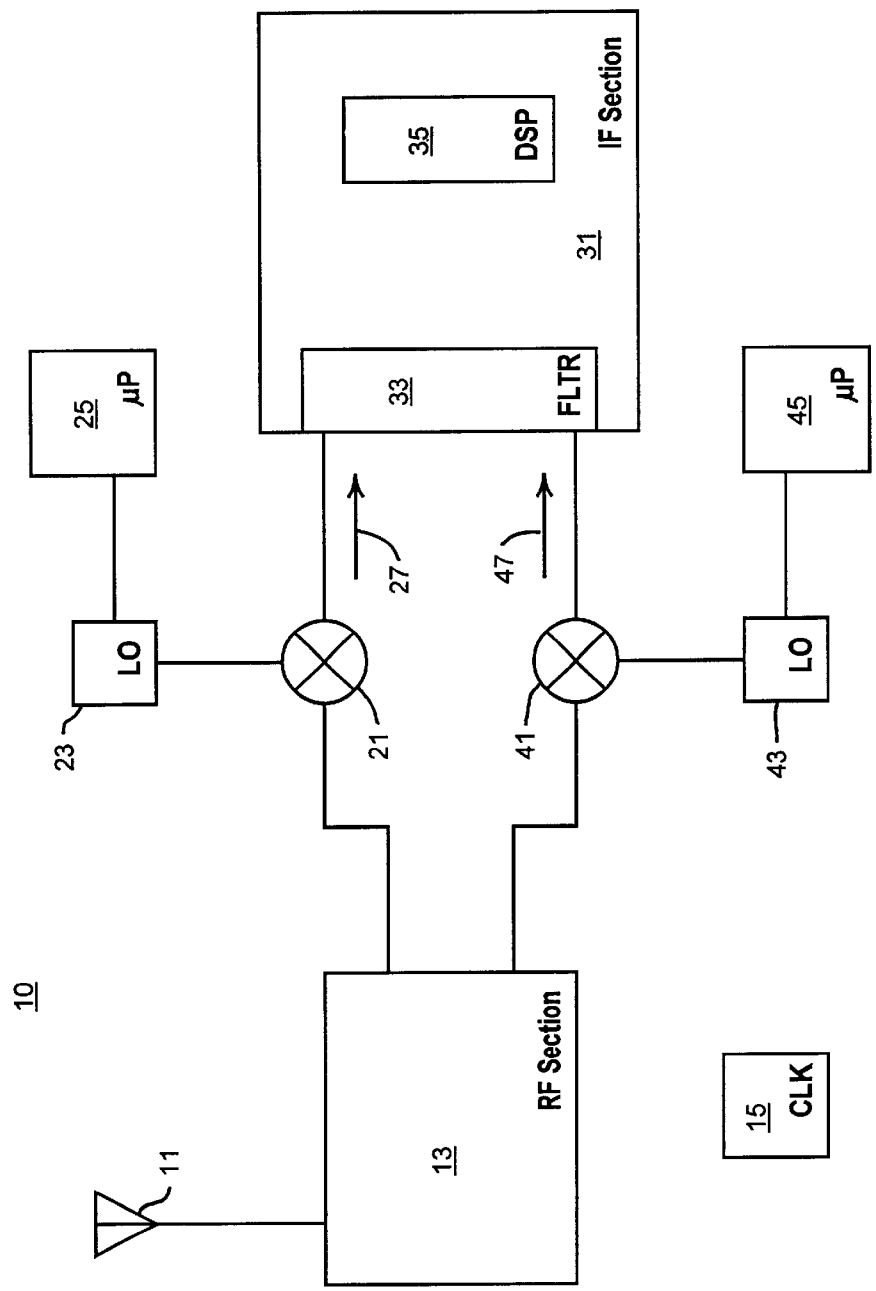
FIG. 1 is a diagrammatical view of a GPS/GLONASS receiver in accordance with the present invention.

FIG. 1 is a diagrammatical view of a satellite-based ground-positioning receiver system 10 as may be used in the present invention. The receiver system 10 includes an antenna 11 for receiving pseudorandom-noise-encoded signals from, for example, Global Positioning System (GPS) satellites and frequency-division multiple access (FDMA) signals from the GLONASS satellites (not shown) and passing the signals along to a radio frequency (RF) section 13. A local oscillator is used to down-convert the respective RF signal to an intermediate frequency (IF) signal. A receiver clock 15 provides a clock reference.

In a preferred embodiment, the signals from the GPS satellites are combined at a GPS mixer 21 with the signal from a GPS local oscillator 23. The local oscillator 23 is under the control of a microprocessor 25 which establishes the IF frequency. The resultant GPS IF signal 27 passes to an IF section 31 for filtering and for further processing. The IF section 31 typically includes a filter 33, such as a surface acoustic wave (SAW) filter, and a digital signal processor 35.

The signals from the GLONASS satellites pass through the RF section 13 and are combined at a GNS mixer 41 with the signal from a GNS local oscillator 43. The local oscillator 43 is controlled by a microprocessor 45. The resultant GNS IF signal 47 passes to the IF section 31 for filtering and processing. As can be appreciated by one skilled in the relevant art, there are frequency-dependent transmission delays incurred by the GLONASS satellite signals in passing through the RF section 13. Moreover, IF signals of varying frequencies enter the IF section 31 and incur further delays, also frequency-dependent, in passing through the SAW filter 33.

The principal source of the inter-frequency biases in the receiver system 10 is the SAW filter 33. The disclosed method provides a means to calibrate the biases resulting from the frequency-related effects of the SAW filter 33. A preferred calibration procedure suitable for use in the field uses a single GLONASS receiver with 'live' GLONASS and GPS signals. An alternative procedure, suitable for factory calibration or screening, uses a GLONASS receiver with a single-channel GLONASS simulator. In brief, the disclosed procedure includes the following steps: i) the dynamics of the GPS and the GLONASS satellites are removed by using the ephemeris data for the satellites; ii) the change in receiver clock offset is estimated by means of GPS satellite measurements, and iii) a set of two or more measurements is made at different satellite frequencies controlled by changing the frequency of the GNS reference oscillator 43 to estimate the corresponding inter-frequency bias.

The GPS pseudorange measurement $P_{GPS}$ at each time epoch $t_N$ can be expressed as follows:

$$P_{GPS}(t_N) = R_{GPS}(t_N) + C_R(t_N) - C_{GPS}(t_N) + \epsilon_{SA}(t_N) + \epsilon_{MP}(t_N) + \epsilon_{WN}(t_N) + \epsilon_{AG}(t_N) \quad (1)$$

where: $R_{GPS}(t_N)$ is the theoretical range between a GPS satellite and the receiver system 10;

$C_{R(tN)}$ is the offset of the receiver clock 15;

$C_{GPS}(t_N)$ is the offset of the GPS satellite clock;

$\epsilon_{SA}(t_N)$ is the error induced by the selective availability feature;

$\epsilon_P(t_N)$ is the error due to GPS multipath at the receiver system 10;

$\epsilon_{WN}(t_N)$ is the error due to white noise in the receiver system 10; and $\epsilon_{AG}(t_N)$ is the aggregate error which includes atmospheric delay, residual GPS satellite position, and GPS clock errors. The GPS theoretical range $R_{GPS}(t_N)$ is derived using known position of the user and ephemeris data. In a typical application, the user's position is fixed and known within 100 meters and the ephemeris data is precise enough to provide an accurate bias correction. The GPS satellite clock offset $C_{GPS}(t_N)$ can be obtained from downlink data.

In accordance with the inventive method, a receiver clock correction term CLKcorr$_{GPS}$ is determined as a function of the pseudorange $P_{GPS}$, the theoretical range $R_{GPS}$, and the GPS satellite clock offset $C_{GPS}$. The parameter values are obtained at successive instances of time ($t_0, t_1, \ldots t_n$). The values are averaged and used to estimate inter-frequency biases as explained in greater detail below. In a preferred embodiment, three measured values are obtained at consecutive times $t_0$, $t_1$, and $t_2$. For a set of three values $f(t_0)$, $f(t_1)$, and $f(t_2)$, the average value is given by $[f(t_0) - 2f(t_1) + f(t_2)]$. These averaged values provide a receiver clock correction term CLKcorr$_{GPS}$ in accordance with the expression:

$$CLKcorr_{GPS}(t_2) = [P_{GPS}(t_0) - 2P_{GPS}(t_1) + P_{GPS}(t_2)] - \quad (2)$$
$$[R_{GPS}(t_0) - 2R_{GPS}(t_1) + R_{GPS}(t_2)] +$$
$$[C_{GPS}(t_0) - 2C_{GPS}(t_1) + C_{GPS}(t_2)]$$

It has been determined that three measurements are adequate to offset the effects of selective availability (where present) and multipath. Preferably, the measurements are performed within ten to twelve seconds to assure good pull-in without compromising measurement accuracy. Because the value of the aggregate error $\epsilon_{AG}(t_N)$ changes little during the measurement period ($t_2 - t_0$), the term $[\epsilon_{AG}(t_0) - 2\epsilon_{AG}(t_1) + \epsilon_{AG}(t_2)]$ becomes negligible over this period and equation (2) reduces to the expression:

$$CLKcorr_{GPS}(t_2) = \epsilon_{CORRGPS} + [C_R(t_0) - 2C_R(t_1) + C_R(t_2)] \quad (3)$$

where $$\epsilon_{CORRGPS} = \epsilon_{SA} + \epsilon_{MP} + \epsilon_{WN} \quad (4)$$

and $$\epsilon_{SA} = \epsilon_{SA}(t_0) - 2\epsilon_{SA}(t_1) + \epsilon_{SA}(t_2)$$
$$\epsilon_{MP} = \epsilon_{MP}(t_0) - 2\epsilon_{MP}(t_1) + \epsilon_{MP}(t_2) \quad (5)$$
$$\epsilon_{WN} = \epsilon_{WN}(t_0) - 2\epsilon_{WN}(t_1) + \epsilon_{WN}(t_2)$$

The correction term CLKcorr$_{GPS}$ for the GPS signal is thus expressed as a function of selective availability (when present), multipath, white noise, and the offset of the receiver clock 15. It should be noted that the standard deviation of the error, $\sigma_{CORRGPS}$, can be reduced to $$\frac{\sigma_{CORRGPS}}{\sqrt{n}}$$

by averaging the estimates from a plurality of n GPS satellites.

With respect to the GLONASS satellite signals, the pseudorange measurement $P_{GNS}$ for a satellite operating at a frequency $f_M$ can be represented by the expression:

$$P_{GNS}(t_N, f_M) = R_{GNS}(t_N) + b_{GPSGNS} + C_R(t_N) - C_{GNS}(t_N) + b_U(f_M) + b_L(f_M) + \epsilon'_{MP}(t_N) + \epsilon'_{WN}(t_N) + \epsilon'_{AG}(t_N) \quad (6)$$

where $R_{GNS}(t_N)$ is the theoretical range between the GLONASS satellite and the receiver system 10;

$b_{GPSGNS}$ is the essentially constant difference between GPS and GLONASS clocks and includes the RF delay difference between GPS and GLONASS satellite signals in the receiver system 10;

$C_{GNS}(t_N)$ is the offset of the GLONASS satellite clock;

$b_U(f_M)$ is the pseudorange bias for frequency M caused by receiver components located in the signal path upstream of the GNS mixer 41;

$b_L(f_M)$ is the pseudorange bias for frequency M caused by receiver components located in the signal path downstream of the GNS mixer 41;

$\epsilon'_{MP}(t_N)$ is the error due to GLONASS multipath at the receiver system 10;

$\epsilon'_{WN}(t_N)$ is the error due to white noise in the receiver system 10; and $\epsilon'_{AG}(t_N)$ is the aggregate error which includes atmospheric delay, residual GLONASS satellite position, and related clock errors.

As stated above, because the downstream bias parameter $b_L(f_M)$ is considered to be the principal contributor to the inter-frequency biases, the upstream parameter $b_U(f_M)$ is not determined in the preferred embodiment and, accordingly, is not included in subsequent derivation.

In the preferred embodiment, the difference in bias at a satellite frequency $f_K$ and a reference frequency $f_{REF}$ is computed by obtaining a series of three measurements from a selected satellite transmitting at frequency $f_M$. Preferably, the reference frequency $f_{REF}$ is one of the twenty-four defined GLONASS satellite operating frequencies, but it should be understood that a reference frequency utilized in the present invention is not limited to GLONASS frequencies. The GNS local oscillator 43 is used to place the satellite signal at the IF frequencies normally used by $f_{REF}$ and $f_K$, as needed. Two measurements, at times $t_0$ and $t_2$, are obtained at the reference frequency $f_{REF}$, and the third measurement, at time $t_1$, is obtained at IF frequencies corresponding to the satellite frequency $f_K$ as explained in greater detail below.

Figure 2A:
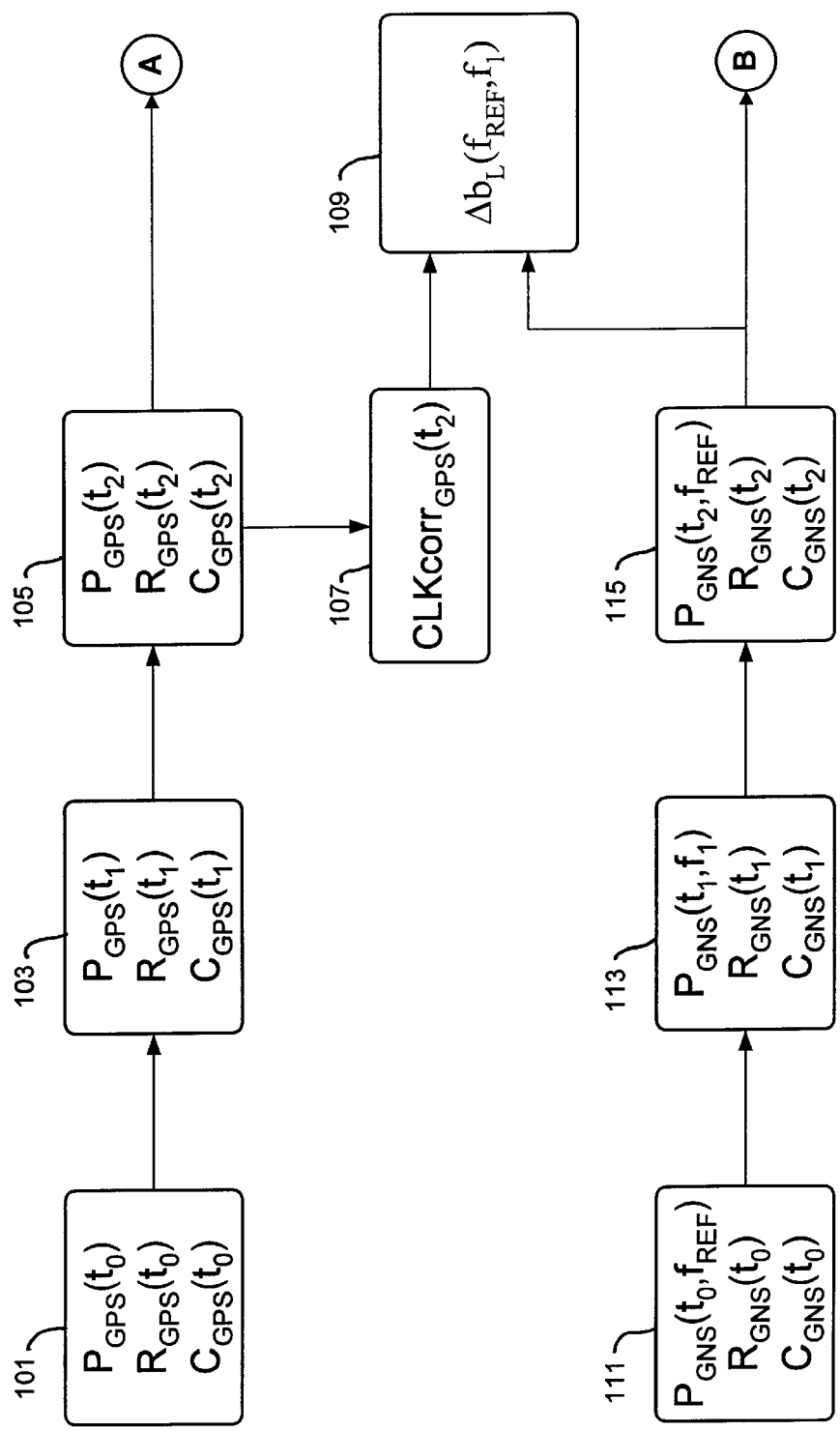
FIG. 2 is a flow chart illustrating a three-measurement method for obtaining an inter-frequency bias correction factor in accordance with the present invention.
Figure 2B:
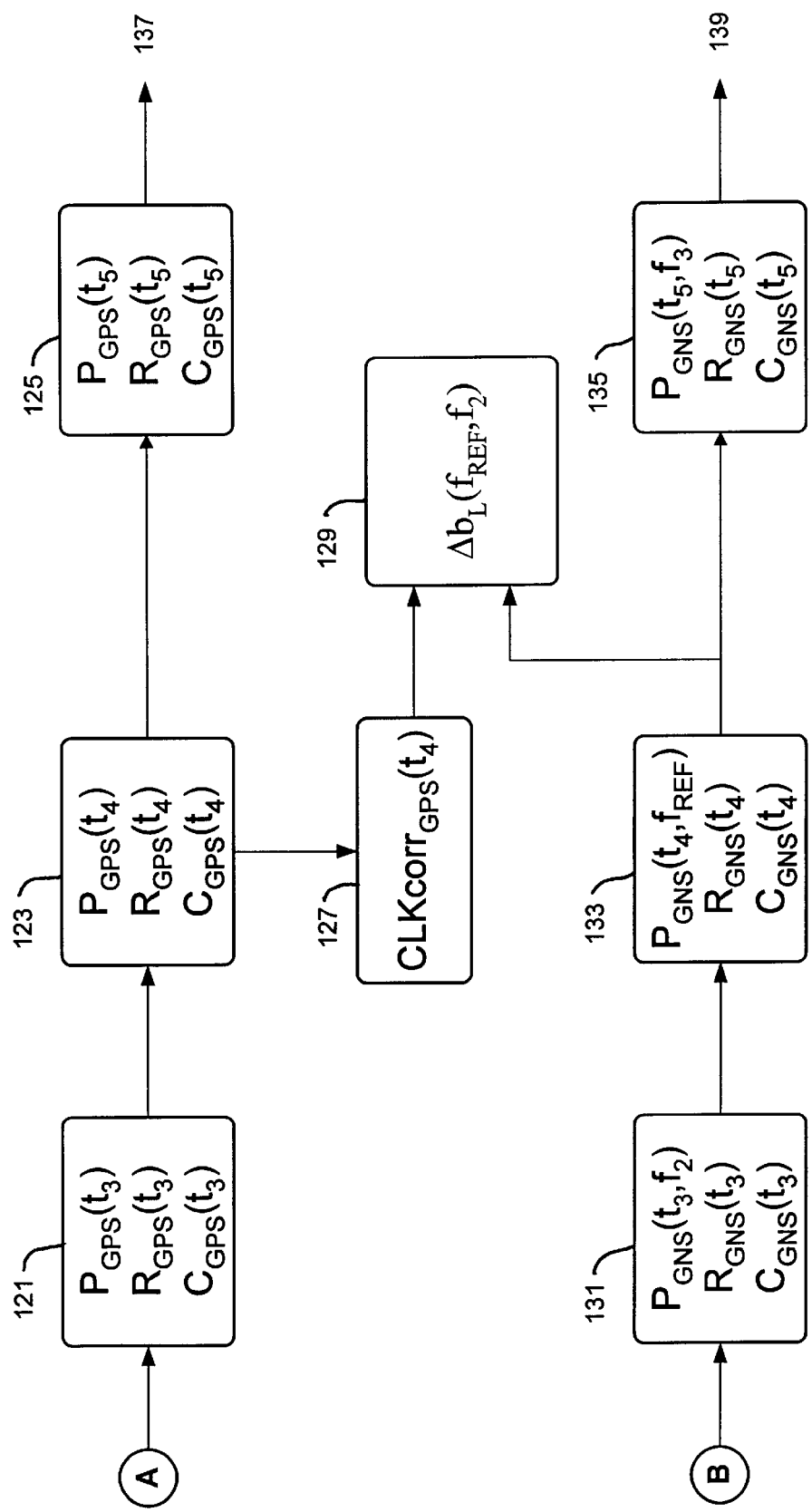

The following equation is used for estimating the difference in pseudorange bias $\Delta \hat{b}_L$ for the satellite frequency $f_K$ and the reference frequency $f_{REF}$:

$$\Delta \hat{b}_L(f_{REF}, f_K) = 0.5 * \{[P_{GNS}(t_0, f_{REF}) - 2P_{GNS}(t_1, f_K) + \quad (7)$$
$$P_{GNS}(t_2, f_{REF})] - [R_{GNS}(t_0) - 2R_{GNS}(t_1) +$$
$$R_{GNS}(t_2)] + [C_{GNS}(t_0) - 2C_{GNS}(t_1) +$$
$$C_{GNS}(t_2)] - CLKcorr_{GPS}\}$$

where $R_{GNS}(t)$ and $C_{GNS}(t)$ are computed from the GLONASS ephemeris data and the fixed position of the receiver system 10. This can be explained in greater detail with reference to FIG. 2 in which the three-measurement procedure for computing a value for the pseudorange bias difference $\Delta \hat{b}_L$ ($f_{REF}$,$f_1$) for the GLONASS satellite frequency $f_1$ includes the following operations:

1. Obtain GPS satellite pseudorange measurements at times $t_0$, $t_1$, and $t_2$ to give $P_{GPS}(t_0)$, $P_{GPS}(t_1)$, and $P_{GPS}(t_2)$, in boxes 101, 103, and 105.
2. Compute GPS theoretical range measurements at times $t_0$, $t_1$, and $t_2$ to give $R_{GPS}(t_0)$, $R_{GPS}(t_1)$, and $R_{GPS}(t_2)$, in boxes 101, 103, and 105.
3. Determine GPS satellite clock offset at times $t_0$, $t_1$, and $t_2$ to give $C_{GPS}(t_0)$, $C_{GPS}(t_1)$, and $C_{GPS}(t_2)$, in boxes 101, 103, and 105.
4. Use the values from operations 1 through 3 in equation (2) to obtain a value for the receiver clock correction term $CLKcorr_{GPS}(t_2)$, in box 107.
5. Obtain GLONASS satellite pseudorange measurements at times $t_0$, $t_1$, and $t_2$ to give $P_{GNS}(t^0, f_{REF})$, $P_{GNS}(t_1, f_1)$, and $P_{GNS}(t_2, f_{REF})$, in boxes 111, 113, and 115. Preferably, one GLONASS satellite is used and the frequency of the GNS IF signal 47 is changed between $f_{REF}$ and $f_1$ by means of the GNS local oscillator 43.
6. Compute GLONASS theoretical range measurements at times $t_0$, $t_1$, and $t_2$ to give $R_{GNS}(t_0)$, $R_{GNS}(t_1)$, and $R_{GNS}(t_2)$, in boxes 111, 113, and 115.
7. Determine GLONASS satellite clock offset at times $t_0$, $t_1$, and $t_2$ to give $C_{GNS}(t_0)$, $C_{GNS}(t_1)$, and $C_{GNS}(t_2)$, in boxes 111, 113, and 115.
8. Use the values from operations 4 through 7 in equation (7) to obtain a value for the bias difference $\Delta \hat{b}_L(f_{REF}, f_1)$, in box 109.

The value for $\Delta \hat{b}_L(f_{REF}, f_2)$ can be found by performing the following additional operations:

9. Retain the most recent values for $P_{GPS}(t_2)$, $R_{GPS}(t_2)$, $C_{GPS}(t_2)$, $P_{GNS}(t_2, f_{REF})$, $R_{GNS}(t_2)$, and $C_{GNS}(t_2)$ from operations 1 through 8.
10. Obtain GPS satellite pseudorange measurements at times $t_3$ and $t_4$ to give $P_{GPS}(t_3)$ and $P_{GPS}(t_4)$, in boxes 121 and 123.
11. Compute GPS theoretical range measurements at times $t_3$ and $t_4$ to give $R_{GPS}(t_3)$ and $R_{GPS}(t_4)$, in boxes 121 and 123.
12. Determine GPS satellite clock offset at times $t_3$ and $t_4$ to give $C_{GPS}(t_3)$ and $C_{GPS}(t_4)$, in boxes 121 and 123.
13. Use the retained values from operation 9 and the values obtained in operations 10 through 12 to obtain a value for the receiver clock correction term $CLKcorr_{GPS}(t_4)$, in box 127.
14. Obtain GLONASS satellite pseudorange measurements at times $t_3$ and $t_4$ to give $P_{GNS}(t_3,f_2)$ and $P_{GNS}(t_4,f_{REF})$, in boxes 131 and 133.
15. Compute GLONASS theoretical range measurements at times $t_3$ and $t_4$ to give $R_{GNS}(t_3)$ and $R_{GNS}(t_4)$, in boxes 131 and 133.
16. Determine GLONASS satellite clock offset at times $t_3$ and $t_4$ to give $C_{GNS}(t_3)$ and $C_{GNS}(t_4)$, in boxes 131 and 133.
17. Use the retained values from operation 9 and the values obtained in operations 13 through 16 to obtain a value for the bias difference $\Delta \hat{b}_L(f_{REF},f_2)$ in box 129.

To compute a value for bias difference $\Delta \hat{b}_L(f_{REF},f_3)$, the calibration process continues to box 125, for derivation of $P_{GPS}(t_5)$, $R_{GPS}(t_5)$, and $C_{GPS}(t_5)$ and to box 135 for derivation of $P_{GNS}(t_5,f_3)$, $R_{GNS}(t_5)$, and $C_{GNS}(t_5)$, and follows a procedure similar to operations 9 through 17 above, as indicated by arrows 137 and 139.

This procedure is repeated for any of the GLONASS satellite frequencies of interest. In way of example, the calibration for the four satellite frequencies $f_a$, $f_b$, $f_c$, and $f_d$ is performed by making an estimate of $\Delta b_L(f_{REF},f_a)$, $\Delta b_L(f_{REF},f_b)$, $\Delta b_L(f_{REF},f_c)$, and $\Delta b_L(f_{REF},f_d)$. This is done by selecting the signals of a particular GLONASS satellite and adjusting the GNS local oscillator 43 to obtain a series of measurements on the selected satellite signals at GLONASS frequencies $f_{REF}$, $f_a$, $f_{REF}$, $f_b$, $f_{REF}$, $f_c$, $f_{REF}$, $f_d$, and $f_{REF}$. Then, for derivation of the respective inter-frequency bias correction terms, the results are preferably combined into groups of three measurements each: ($f_{REF},f_a,f_{REF}$), ($f_{REF},f_b,f_{REF}$), ($f_{REF},f_c,f_{REF}$), and ($f_{REF},f_d,f_{REF}$).

A time interval of about ten to twelve seconds between each set of measurement groups assures good pull-in without excessive error due to factors such as selective availability. When all the differences have been estimated once, the process starts again from $f_{REF}$, $f_a$, and $f_{REF}$ so that a set of bias difference estimates for each frequency can be averaged together to form the final bias estimate. The resultant values are stored in a nonvolatile memory as correction values.

The disclosed method provides an accurate estimate of the inter-frequency biases. This can be shown by noting that, if the expressions for $P_{GNS}(t_N)$ from equation (6) and CLKcorr$_{GPS}$ from equation (3) are substituted in equation (7), the pseudorange bias estimate can be expressed as:

$$\Delta \hat{b}_L(f_{REF},f_K) = 0.5 * \{\epsilon_{GNS} - \epsilon_{CORRGPS} + 2[b_L(f_{REF}) - b_L(f_K)]\} \quad (8)$$

where, $$\epsilon_{GNS} = [\epsilon'_{MP}(t_0) - 2\epsilon'_{MP}(t_1) + \epsilon'_{MP}(t_2)] + [\epsilon'_{WN}(t_0) - 2\epsilon'_{WN}(t_1) + \epsilon'_{WN}(t_2)] \quad (9)$$

The pseudorange bias estimate error is thus on the order of $0.5*(\epsilon_{GNS} - \epsilon_{CORRGPS})$.

For an environment in which multipaths effects are at a reduced level, or where the selective availability feature is not a factor, the pseudorange bias estimate can be obtained by using only two measurements for each GLONASS satellite frequency of interest. Accordingly, for a set of two values $f(t_0)$ and $f(t_1)$, the average value is given by $[f(t_0) - f(t_1)]$. In the alternative, two-measurement method, the pseudorange bias $\Delta \hat{b}_L$ is then given by:

$$\Delta \hat{b}_L(f_{REF}, f_K) = [P_{GNS}(t_0, f_{REF}) - P_{GNS}(t_1, f_K)] - \quad (10)$$
$$[R_{GNS}(t_0) - R_{GNS}(t_1)] +$$
$$[C_{GNS}(t_0) - C_{GNS}(t_1)] - CLKcorr_{GPS}$$

where $$CLKcorr_{GPS}(t_1) = [P_{GPS}(t_0) - P_{GPS}(t_1)] - [R_{GPS}(t_0) - R_{GPS}(t_1)] + [C_{GPS}(t_0) - C_{GPS}(t_1)] \quad (11)$$

Figure 3:
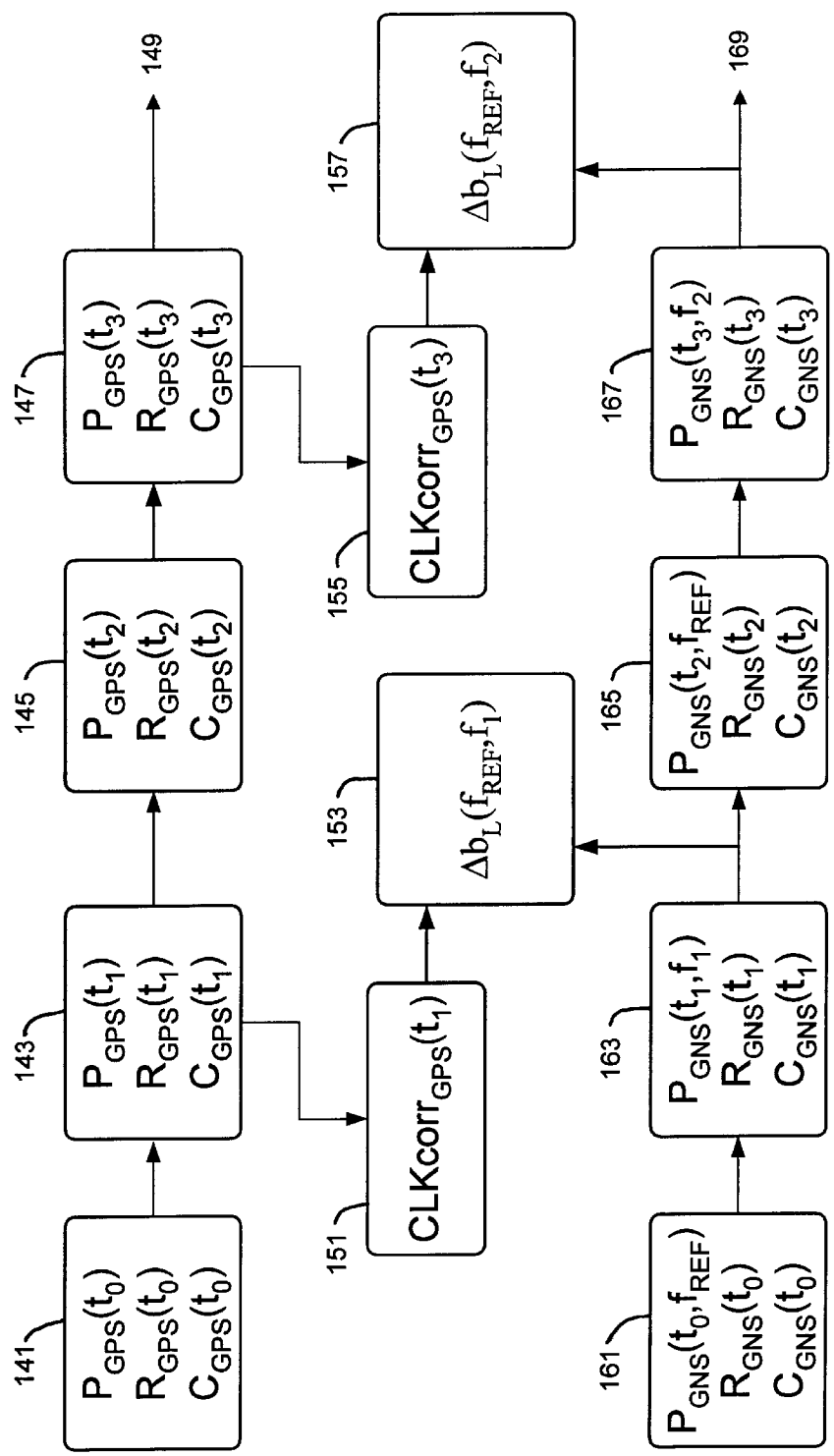
FIG. 3 is a flow chart illustrating an alternative two-measurement method for obtaining a correction factor in accordance with the present invention.

In the alternative two-measurement method, the procedure for computing a value for the pseudorange bias differences $\Delta\hat{b}_L(f_{REF},f_1)$, $\Delta\hat{b}_L(f_{REF},f_2)$ ... $\Delta\hat{b}_L(f_{REF},f_N)$ for the GLONASS satellite frequencies $f_1, f_2 ... f_N$ includes the following operations, as shown in FIG. 3:

1. Obtain GPS satellite pseudorange measurements at times $t_0$ and $t_1$ to give $P_{GPS}(t_0)$ and $P_{GPS}(t_1)$, in boxes 141 and 143.
2. Compute GPS theoretical range measurements at times $t_0$ and $t_1$ to give $R_{GPS}(t_0)$ and $R_{GPS}(t_1)$, in boxes 141 and 143.
3. Determine GPS satellite clock offset at times $t_0$ and $t_1$ to give $C_{GPS}(t_0)$ and $C_{GPS}(t_1)$, in boxes 141 and 143.
4. Use the values from operations 1 through 3 in equation (11) to obtain a value for the receiver clock correction term $CLKcorr_{GPS}(t_1)$, in box 151.
5. Obtain GLONASS satellite pseudorange measurements at times $t_0$ and $t_1$ to give $P_{GNS}(t_0,f_{REF})$ and $P_{GNS}(t_1,f_1)$, in boxes 161 and 163, using one GLONASS satellite where the frequency of the GNS IF signal 47 is changed from $f_{REF}$ to $f_1$ by means of the GNS local oscillator 43.
6. Compute GLONASS theoretical range measurements at times $t_0$ and $t_1$ to give $R_{GNS}(t_0)$ and $R_{GNS}(t_1)$, in boxes 161 and 163.
7. Determine GLONASS satellite clock offset at times $t_0$ and $t_1$ to give $C_{GNS}(t_0)$ and $C_{GNS}(t_1)$, in boxes 161 and 163.
8. Use the values from operations 4 through 7 in equation (10) to obtain a value for the bias difference $\Delta\hat{b}_L(f_{REF},f_1)$, in box 153.
9. Obtain GPS satellite pseudorange measurements at times $t_2$ and $t_3$ to give $P_{GPS}(t_2)$ and $P_{GPS}(t_3)$, in boxes 145 and 147.
10. Compute GPS theoretical range measurements at times $t_2$ and $t_3$ to give $R_{GPS}(t_2)$ and $R_{GPS}(t_3)$, in boxes 145 and 147.
11. Determine GPS satellite clock offset at times $t_2$ and $t_3$ to give $C_{GPS}(t_2)$ and $C_{GPS}(t_3)$, in boxes 145 and 147.
12. Use the values obtained in operations 9 through 11 to obtain a value for the receiver clock correction term $CLKcorr_{GPS}(t_3)$, in box 155.
13. Obtain GLONASS satellite pseudorange measurements at times $t_2$ and $t_3$ to give $P_{GNS}(t_2,f_{REF})$ and $P_{GNS}(t_3,f_2)$, in boxes 165 and 167.
14. Compute GLONASS theoretical range measurements at times $t_2$ and $t_3$ to give $R_{GNS}(t_2)$ and $R_{GNS}(t_3)$, in boxes 165 and 167.
15. Determine GLONASS satellite clock offset at times $t_2$ and $t_3$ to give $C_{GNS}(t_2)$ and $C_{GNS}(t_3)$, in boxes 165 and 167.
16. Use the values obtained in operations 12 through 15 to obtain a value for the bias difference $\Delta\hat{b}_L(f_{REF},f_2)$, in box 157.
17. Repeat operations 1 through 4, as indicated by arrow 149, to compute a value for $CLKcorr_{GPS}(t_5)$ by deriving $P_{GPS}(t_4)$, $P_{GPS}(t_5)$, $R_{GPS}(t_5)$, $R_{GPS}(t_5)$, $C_{GPS}(t_4)$, and $C_{GPS}(t_5)$.
18. Repeat operations 5 through 8, as indicated by arrow 169, to compute a value for bias difference $\Delta\hat{b}_L(f_{REF},f_3)$ by deriving values for $P_{GNS}(t_4,f_{REF})$, $P_{GNS}(t_5,f_3)$, $R_{GNS}(t_4)$, $R_{GNS}(t_5)$, $C_{GNS}(t_4)$, and $C_{GNS}(t_5)$.

Invoking the above two-measurement procedure for the four satellite frequencies $f_a$, $f_b$, $f_c$, and $f_d$, an estimate is made of the expressions $\Delta\hat{b}_L(f_{REF},f_a)$, $\Delta\hat{b}_L(f_{REF},f_b)$, $\Delta\hat{b}_L(f_{REF},f_c)$, and $\Delta\hat{b}_L(f_{REF},f_d)$. In one embodiment, this is done by obtaining a series of measurements on the selected satellite signals at GLONASS frequencies $f_{REF}$, $f_a$, $f_{REF}$, $f_b$, $f_{REF}$, $f_c$, $F_{REF}$, $f_d$, and $f_{REF}$. Then, for derivation of the respective inter-frequency bias correction terms, the results are preferably combined into groups of two measurements each: $(f_{REF}, f_a)$, $(F_{REF}, f_b)$, $(F_{REF}, f_c)$, and $(f_{REF}, f_d)$ In another embodiment, computational resources may be decreased by making the measurements in the following order: $F_{REF}$, $f_a$, $f_b$, $f_{REF}$, $f_c$, $f_d$, and $f_{REF}$. For derivation of the respective inter-frequency bias correction terms, the results are combined into groups of two measurements each: $(f_{REF}, f_a)$, $(f_b, f_{REF})$, $(f_{REF}, f_c)$, and $(f_{REF}, f_d)$ where the same $f_{REF}$ value is used in derivation with both $f_b$ and $f_c$.

In yet another alternative embodiment, a GLONASS single-channel simulator is set up to transmit on a specified GLONASS frequency with zero Doppler frequency. If the simulator and the receiver system 10 are set up to operate from the same clock, the theoretical pseudorange will not be changing, and there will be no relative change between the simulator and the receiver system 10 as a consequence of clock drift. The receiver system 10 then cycles through a series of twenty-four measurements, adjusting the GNS local oscillator 43 each time to move it ahead by one frequency interval. Each measurement set is taken over a time interval suitable for 'smoothing' the pseudorange such that the accuracy can be brought to the desired level of the calibration. To obtain the final result, each smoothed pseudorange is differenced with that taken at the specified frequency to obtain the bias difference at all the frequencies.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A method for reducing frequency-dependent bias effects in a fixed satellite-based ground-positioning receiver having the capability to receive both pseudorandom noise (PRN) encoded signals such as transmitted by GPS satellites, and frequency division multiple access (FDMA) signals such as transmitted by GLONASS satellites, said method comprising the steps of:

obtaining pseudorange measurements from the PRN signals at times $t_0$, $t_1$, and $t_2$;

computing theoretical PRN satellite range measurements at times $t_0$, $t_1$, and $t_2$;

determining PRN satellite clock offsets at times $t_0$, $t_1$, and $t_2$;

deriving a PRN correction value at time $t_2$ from said PRN pseudorange measurements, said theoretical PRN range measurements, and said PRN satellite clock offsets;

obtaining FDMA pseudorange measurements (i) at time $t_0$ and at a reference frequency $f_{REF}$, (ii) at time $t_1$ and at a first frequency $f_1$, and (iii) at time $t_2$ and at said reference frequency $f_{REF}$;

computing theoretical FDMA satellite range measurements at times $t_0$, $t_1$, and $t_2$;

determining FDMA satellite clock offsets at times $t_0$, $t_1$, and $t_2$; and obtaining a bias correction value at time $t_2$ for said first frequency $f_1$ from said PRN correction value at time $t_2$, said FDMA pseudorange measurements, said theoretical FDMA satellite range measurements, and said FDMA satellite clock offsets.

2. The method of claim 1 wherein said step of deriving said PRN correction value at time $t_2$ comprises a step of averaging said PRN measurements and offsets by adding a said PRN measurement or offset at time $t_0$ to a respective said PRN measurement or offset at time $t_2$ and subtracting therefrom twice the value of the respective said PRN measurement or offset at time $t_1$.

3. The method of claim 2 further comprising the step of averaging said FDMA measurements and offsets by adding said FDMA measurements or offsets at said reference frequency $f_{REF}$ and subtracting therefrom twice the value of the respective said FDMA measurement or offset at said first frequency $f_1$.

4. The method of claim 3 wherein said step of obtaining a bias correction value at time $t_2$ comprises the step of combining said averaged FDMA measurements and offsets with said bias correction value at time $t_2$.

5. The method of claim 1 further comprising the steps of:
obtaining pseudorange measurements from the PRN signals at times $t_3$ and $t_4$;
computing theoretical PRN satellite range measurements at times $t_3$ and $t_4$;
determining PRN satellite clock offsets at times $t_3$ and $t_4$;
deriving a PRN correction value at time $t_4$ from said PRN pseudorange measurements, said theoretical PRN range measurements, and said PRN satellite clock offsets;
obtaining FDMA pseudorange measurements (i) at time $t_3$ and at a second frequency $f_2$, and (ii) at time $t_4$ and at said reference frequency $f_{REF}$;
computing theoretical FDMA satellite range measurements at times $t_3$ and $t_4$;
determining FDMA satellite clock offsets at times $t_3$ and $t_4$; and
obtaining a bias correction value at time $t_4$ for said second frequency $f_2$ from said PRN correction value at time $t_2$, said FDMA pseudorange measurements, said theoretical FDMA satellite range measurements, and said FDMA satellite clock offsets.

6. A method for reducing frequency-dependent bias effects in a fixed satellite-based ground-positioning receiver having the capability to receive both pseudorandom noise (PRN) encoded signals such as transmitted by GPS satellites, and frequency division multiple access (FDMA) signals such as transmitted by GLONASS satellites, said method comprising the steps of:
obtaining pseudorange measurements from the PRN signals at times $t_0$ and $t_1$;
computing theoretical PRN satellite range measurements at times $t_0$ and $t_1$;
determining PRN satellite clock offsets at times $t_0$ and $t_1$;
deriving a PRN correction value at time $t_1$ from said PRN pseudorange measurements, said theoretical PRN range measurements, and said PRN satellite clock offsets;
obtaining FDMA pseudorange measurements (i) at time $t_0$ and at a first frequency $f_{REF}$, and (ii) at time $t_1$ and at a second frequency $f_1$;
computing theoretical FDMA satellite range measurements at times $t_0$ and $t_1$;
determining FDMA satellite clock offsets at times $t_0$ and $t_1$; and
obtaining a bias correction value at time $t_1$ for said second frequency $f_1$ from said PRN correction value at time $t_1$, said FDMA pseudorange measurements, said theoretical FDMA satellite range measurements, and said FDMA satellite clock offsets.

7. The method of claim 6 wherein said step of deriving said PRN correction value at time $t_1$ comprises a step of averaging said PRN measurements and offsets by determining the difference between a said PRN measurement or offset at time $t_0$ and a respective said PRN measurement or offset at time $t_1$.

8. The method of claim 7 further comprising the step of averaging said FDMA measurements and offsets by determining the difference between a said FDMA measurement or offset at said first frequency $f_{REF}$ and a respective said FDMA measurement or offset at said second frequency $f_1$.

9. The method of claim 8 wherein said step of obtaining a bias correction value at time $t_2$ for said second frequency $f_1$ comprises the step of combining said averaged FDMA measurements and offsets with said bias correction value at time $t_2$.

10. A method for reducing frequency-dependent bias effects in a fixed satellite-based ground-positioning receiver having the capability to receive both pseudorandom noise (PRN) encoded signals such as transmitted by GPS satellites, and frequency division multiple access (FDMA) signals such as transmitted by GLONASS satellites, said method comprising the steps of:
deriving PRN source positional data by using the PRN encoded signals;
deriving receiver clock correction data using said PRN source positional data;
deriving FDMA source positional data at a reference frequency by using the FDMA encoded signals;
deriving FDMA source positional data at a first frequency by using the FDMA encoded signals; and
calculating a correction term for said first frequency from said derived data, said correction term for reducing the frequency-dependent bias effects.

11. The method of claim 10 wherein said step of deriving PRN source positional data includes the steps of obtaining PRN pseudorange measurements, computing PRN source range measurements, and determining PRN source clock offsets.

12. The method of claim 11 wherein said step of deriving receiver clock correction data comprises the step of averaging said PRN pseudorange measurements, said PRN source range measurements, and said PRN source clock offsets.

13. The method of claim 12 further comprising the step of averaging said FDMA source positional data at said reference frequency and said FDMA source positional data at said first frequency.

14. The method of claim 13 wherein said step of calculating a correction term from said derived data includes the steps of using said derived receiver clock correction data and said averaged FDMA measurements.

15. The method of claim 10 wherein said step of deriving FDMA source positional data at said reference frequency includes the steps of obtaining an FDMA pseudorange measurement, computing a FDMA source range measurement, and determining a FDMA source clock offset.

16. The method of claim 10 further comprising the steps of:
deriving FDMA source positional data at a second frequency by using the FDMA encoded signals; and
calculating a correction term for said second frequency from said derived data.

* * * * *